US005688850A

United States Patent [19]

Wyffels

[11] Patent Number: 5,688,850
[45] Date of Patent: Nov. 18, 1997

[54] PLASTICIZER COMPOSITION

[75] Inventor: Donatien Wyffels, Beziers, France

[73] Assignee: BP Chemicals Limited, London, England

[21] Appl. No.: 462,012

[22] Filed: Jun. 5, 1995

[30] Foreign Application Priority Data

Sep. 12, 1994 [GB] United Kingdom ............ 9418352

[51] Int. Cl.$^6$ ................................. C08K 5/10
[52] U.S. Cl. ................................. 524/317
[58] Field of Search ....................... 524/317

[56] References Cited

U.S. PATENT DOCUMENTS

| | | | |
|---|---|---|---|
| 3,985,691 | 10/1976 | DeTaffin et al. | 260/13 |
| 4,366,099 | 12/1982 | Gaetani et al. | 260/407 |
| 4,379,169 | 4/1983 | Reggio et al. | 426/3 |
| 4,438,140 | 3/1984 | Guillon et al. | 424/61 |
| 5,447,715 | 9/1995 | Roberts | 424/60 |

FOREIGN PATENT DOCUMENTS

| | | |
|---|---|---|
| 0371679 | 6/1990 | European Pat. Off. . |
| 0362869 | 4/1991 | European Pat. Off. . |
| 0421909 | 4/1991 | European Pat. Off. . |
| 2041665 | 3/1971 | Germany . |
| 9213529 | 8/1992 | WIPO . |

*Primary Examiner*—Peter D. Mulcahy
*Attorney, Agent, or Firm*—Brooks Haidt Haffner & Delahunty

[57] ABSTRACT

This invention is a formulation comprising a blend of a polybutene and an aliphatic lactate ester said blend containing from 50–99% w/w of the polybutene. The polybutene may be a poly-n-butenes, polyisobutenes, polymers containing a mixture of n-butene and isobutene monomer units, and mixtures thereof. The aliphatic lactate ester is suitably derivable from lactic acid and an aliphatic alcohol having from 6–10 carbon atoms. These formulations are particularly suitable for use as plasticizers for polymeric resins, especially copolymers of vinyl aromatics with acrylates and/or methacrylates such as e.g. a styrene/acrylate copolymer.

7 Claims, No Drawings

PLASTICIZER COMPOSITION

This invention relates to a novel plasticizer composition and tie use thereof for this purpose in polymer formulations, especially in formulations capable of being used as coatings.

It is well known to use carboxylic acid esters as plasticizers in polymer formulations. Well known amongst these are the esters of aliphatic and aromatic dicarboxylic acids such as the malonates, adipates, glutarates, sebacates and phthalates. It has also been suggested to use lower molecular weight hydrocarbon polymers as plasticizers. One such document is prior published EP-A-0 421 909 which describes lattices for coatings having reduced blushing characteristics. This document describes a vast list of cyclic plasticizers which include inter alia phosphoric acid esters, phthalic anhydride esters and trimellitic acid esters and acyclic plasticizers which include inter alia tie esters of adipic acid, azelaic acid, sebacic acid, caprylic acid, pelargonic acid etc. In addition, tie document also describes tie use of otter cyclic and acyclic plasticizers which include inter alia chlorinated paraffins, hydrogenated terphenyls, glycol esters and relatively low molecular weight polymers and copolymers derived from mono olefins containing 4 to 6 carbon atoms. Whilst several documents disclose generically the use of such olefins polymers as plasticizers, none have exemplified tie specific use of polybutenes in plasticizing compositions. The reason for this is believed to be tie practical difficulties such as incompatibility of polybutenes with the resins to be plasticized over a range of temperatures and tie insufficient amount of incorporation of polybutene in the resin to derive satisfactory plasticizer performance benefits. These difficulties have prevented their widespread use. Chlorinated paraffins have therefore been used for this purpose but these suffer from the disadvantage of containing chlorine. Moreover, the presence of chlorinated solvents in plasticizers may cause undesirable yellowing of the subtrates coated.

It has now been found that by combining the polybutene with a specific co-solvent, a plasticizer formulation can be derived which not only improves the compatibility of the polybutene with the resins to be plasticized but also improves the performance of the plasticized resin, i.e. a performance similar to that achievahle using chlorinated paraffins is obtained at lower incorporation rates of the plasticizer, especially in respect of the glass transition temperature of any coatings applied.

Accordingly, the present invention is a formulation comprising a blend of a polybutene and an aliphatic lactate ester said blend containing from 50–99% w/w of the polybutene.

By the expression "polybutene" as used herein and throughout the specification means a poly-n-butenes, polyisobutenes, polymers containing a mixture of n-butene and isobutene monomer units, and mixtures thereof. A mixture of such polymers is usually obtained by polymerising a raffinate such as e.g. butadiene raffinate from a refinery. References to polyisobutenes in this case includes one or more of the isomeric polyisobutenes.

The aliphatic lactate ester is suitably derivable from lactic acid and an aliphatic alcohol having from 6–10 carbon atoms, preferably a C8 alcohol such as ethyl hexanol, especially 2-ethyl hexanol.

The amount of polybutene in the blend thereof with the aliphatic lactate ester is in the range from 50–99% w/w, suitably from 60–97% w/w, preferably from about 75–95 % w/w, e.g. about 80% w/w. The formulations of the present invention may comprise other components such as e.g. water or other solvents to act as carrier, diluent or dispersing aid.

The formulations of the present invention are particularly suitable for use as plasticizers for polymeric resins, especially resins which comprise copolymers of vinyl aromatics with acrylates and/or methacrylates. A specific example of such a polymeric resin is a styrene/acrylate copolymer.

Thus, according to a further embodiment, the present invention is a plasticized polymeric resin composition comprising a polymeric resin and a plasticizer characterised in that the plasticizer comprises a polybutene and an aliphatic lactate ester.

The formulations of the present invention may be incorporated into the polymeric resins either as such in the form of a preformed blend, or, as an aqueous solution or dispersion thereof, or, in an organic solvent, or, by separately adding the individual components of the blend i.e. the polybutene and the lactate ester to the polymeric resin.

The amount of the formulation of the present invention in a plasticized resin composition is suitably in the range from 5 to 60%w/w, preferably in the range from 10 to 40% w/w based on the weight of the resin in the composition.

A plasticized resin composition based on the formulations of the present invention can be prepared by standard industrial procedures known in the art. Typically, this would involve mixing of the plasticizer formulation of the present invention with a preformed solution of the resin containing other additives such as e.g. wetting agents, followed by addition of fillers and then subjecting the resulting mixture to high shear mixing to achieve adequate dispersion and then finally diluting this dispersion with a suitable solvent to the desired viscosity.

The plasticized polymeric resin compositions produced as above can be suitably formulated to have a glass transition temperature (Tg) in the range from 5°–15° C. above the median ambient temperature depending upon the film thickness in order to offer optimum performance.

The plasticized polymeric resin compositions can contain conventional additives such as eg fillers, thickeners, pigments, wetting agents, binders, hardeners/curing agents and stabilizers. Plasticized polymeric resin compositions of the present invention may be used in coating or non-coating applications. For instance, such plasticized compositions can be used to apply coatings on substrates such as wood, metal, masonry (whether internal or external) or other plastics. In case of the coating applications, the platicized resin compositions may be applied to the substrates by brush coating, roller coating or spray coating using conventional techniques.

The plasticizer formulations of the present invention have the following advantages over those of prior art:
a. have good compatibility with resins plasticized
b. use much lower amount of the plasticizer formulation
c. have low odour
d. absence of yellowing
e. reduce splashing during application of coatings
f. improve brushability of the plasticized resin composition
g. improve durability of the coating
h. reduce environmental pollution by using plasticizers free from chlorine and
i. provide excellent rust and corrosion resistance.

The present invention is further illustrated with reference to the following Examples.

EXAMPLE 1

A composition according to the present invention suitable for use as masonry paint was prepared as described above and was compared for its physical properties with a conventional composition in which the plasticizer was a chlorinated paraffin. The compositions are tabulated below in Table 1:

TABLE 1

| RECIPE | PRIOR ART COMPOSITION | PRESENT COMPOSITION |
|---|---|---|
| Titanium Dioxide | 12.5 | 12.8 |
| Calcium Carbonate | 28.60 | 29.30 |
| OMYA DURCAL ® 10 | 7.00 | 7.17 |
| MANVILLE CELITE ® 281 Silica Filler | 7.30 | 7.48 |
| Soya Lecithin | 0.14 | 0.14 |
| PLIOLITE ® AC80 | 1.90 | 1.94 |
| PLIOLITE ® AC5 | 5.20 | 5.32 |
| ALAIFLEX ® 50A6 | 4.20 | — |
| NAPVIS ® PB 6000 | — | 1.79 |
| Aliphatic Solvent# | 33.2 | 34.01 |

PLIOLITE ® - a grade of styrene/acrylate copolymer (ex Goodyear)
ALAIFLEX ® - chlorinated paraffin (ex Rhone Poulenc)
NAPVIS ®PB 6000 - a blend of NAPVIS ® D5 polybutene (ex BP Chemicals) and 10% w/w ethyl hexyl lactate (ex Purac).
Aliphatic Solvent - white spirit, SG 0.78, aromatic content 17% v/v The plasticized resin compositions were prepared according to the following procedure. The PLIOLITE® resins were swollen in approximately 40% by volume of aliphatic solvent for 12 hours and then mixed for 12 hours. The soya lecithin wetting agent was then added, followed by the NAPVIS® PB 6000 plasticizing formulation of the present invention. The mixture was then mixed for 2 minutes prior to the addition of pigments, fillers and extenders and then mixed again for a further 20 minutes at high shear in order to obtain adequate pigment dispersion. The remaining solvent was then added and the final composition mixed to ensure homogeneity.

The compositions described above had the characteristics shown in Table 2 below:

TABLE 2

| PROPERTY | PRIOR ART COMPOSITION | PRESENT COMPOSITION |
|---|---|---|
| DENSITY | 1.4 | ~1.4 |
| CONCENTRATION % (solids content v/v) | 41.1 | ~41.1 |
| PIGMENT/BINDER RATIO | 5/1 | 6.30/1 |
| Pigment Vol Conc. | 65.0 | 71.7 |
| Tg | 13.0 | 13.0 |

EXAMPLE 2

In a further example, a composition according to the present invention suitable for use as a masonry paint was prepared as described above and compared with a standard paint composition plasticized with a chlorinated paraffin in tests used to measure the performance of paints. The compositions of the paints are tabulated below in Table 3.

TABLE 3

| RECIPE | PRIOR ART COMPOSITION | PRESENT COMPOSITION |
|---|---|---|
| Solvent Naphtha | 103.45 | 103.45 |
| Ethoxy Propanol | 34.50 | 34.50 |
| PLIOLITE ® AC80 | 26.21 | 26.21 |
| PLIOLITE ® AC5 | 37.94 | 37.94 |
| PURASOLV ® BL | 17.25 | 17.25 |

TABLE 3-continued

| RECIPE | PRIOR ART COMPOSITION | PRESENT COMPOSITION |
|---|---|---|
| Soya Lecithin | 5.38 | 5.38 |
| KERR MCGEE CR821 TIO$_2$ | 206.96 | 206.96 |
| OMYA DURCAL ® 5 | 63.51 | 80.77 |
| OMYA MILIKART ® 5PL | 235.93 | 235.93 |
| LUZENAC Talc 0 | 63.47 | 63.47 |
| MANVILLE CELITE 281 | 31.73 | 31.73 |
| ALAIFLEX 50A6 | 41.22 | — |
| NAPVIS ® PB 5000 | — | 23.96 |
| Aliphatic Solvent | 132.45 | 132.45 |

| | |
|---|---|
| Solvent Naphtha | SG 0.87, aromatic content 99% by weight |
| PLIOLITE ® | a grade of styrene/acrylate copolymer (ex Goodyear) |
| PURASOLV ® BL | Butyl lactate (ex Purac) |
| ALAIFLEX ® | a chlorinated paraffin (ex Rhone Poulenc) |
| NAPVIS ® PB 5000 | a blend of NAPVIS ® D5 polybutene (ex BP Chemicals) and 5% w/w ethyl hexyl lactate (ex Purac). |
| OMYA DURCAL 5 OMYA MILIKART 5PL | calcium carbonates |
| Aliphatic Solvent | white spirit, SG 0.78, aromatic content 17% by v/v |

The plasticized compositions were prepared according to the procedure of Example 1 with a combination of the aliphatic, aromatic and polar solvents used to swell the PLIOLITE® resin. In the composition according to the present invention a higher amount of the OMYA DURCAL® 5 calcium carbonate was used in order to make up for the difference in the weight of the plasticizer used. This has no significant effect on the performance of the plasticizer.

To perform the tests, 135 parts by weight of the paint compositions were mixed with a further 15 parts by weight of whim spirit and spread onto standard mild steel plates to give a paint thickness of 35μ. Results of the tests, summarised in Table 4 below, show a similar performance for the paint of the present invention and that for the standard paint plasticized with a chlorinated paraffin.

TABLE 4

| | Method Used | Prior Art Composition | Present Composition |
|---|---|---|---|
| Dry weight (%) | ISO 3233 | 72.9 | 70.1 |
| Adhesion (%) | ISO 2409 | 100 | 100 |
| Cupping (ml) | ISO 1520 | 80 | 80 |
| Direct Impact (12 ml) | ASTM D2794 | 100 | 100 |
| Pendulum Hardness (°) | BS 3900:E5 | 134 | 135 |

In addition, the paints were weathered in a QUV cabinet under cycling conditions of 12 hours UV radiation and 100% humidity followed by 12 hours of 100% humidity for a total of 104 hours. The paints of the present invention provided better protection to the steel plates with only minute rust spots observed while the prior art paint compositions plasticized with a chlorinated paraffin produced very small and some small rust spots, according to the standard Champion Charts for assessment of rusting.

I claim:

1. A composition comprising: (i) a copolymer resin of a vinyl aromatic compound and an acrylate or a methacrylate or a mixture of an acrylate and a methacrylate, and (ii) a plasticizer formulation comprising a blend of a polybutene and an aliphatic lactate ester, said blend containing from 50 to 99% w/w of polybutene based on the weight of the total blend.

2. A composition according to claim 1 wherein the aliphatic ester is an ester of lactic acid and an aliphatic alcohol having from 6–10 carbon atoms.

3. A composition according to claim 1 wherein the aliphatic lactate ester is an ester of lactic acid and 2-ethyl hexanol.

4. A composition according to claim 1 wherein said composition also contains a carrier, diluent or dispersing aid.

5. A composition according to claim 4 wherein said carrier of diluent is water or a solvent.

6. A composition according to claim 1 wherein the resin is a styrene/acrylate copolymer.

7. A plasticized polymeric composition according to claim 1 wherein the amount of the plasticizer formulation present in said composition is in the range from 5 to 60% w/w based on the total composition.

* * * * *

UNITED STATES PATENT AND TRADEMARK OFFICE
CERTIFICATE OF CORRECTION

PATENT NO. : 5,688,850
DATED : November 18, 1997
INVENTOR(S) : DONATIEN WYFFELS

It is certified that error appears in the above-indentified patent and that said Letters Patent is hereby corrected as shown below:

Column 1, lines 4, 17, and 19 (both instances), change "tie" to --the--.

Column 1, line 20, change "otter" to --other--.

Column 1, lines 26, 27, and 30, change "tie" to --the--.

Column 1, line 43, change "achievahle" to --achievable--.

Column 4, line 36, change "whim" to --white--.

Column 5, second line of claim 5, change "of" to --or--

Signed and Sealed this

Twenty-fourth Day of March, 1998

Attest:

BRUCE LEHMAN

*Attesting Officer*     *Commissioner of Patents and Trademarks*